(No Model.)
P. S. WITCHER.
COMBINED BAIL AND HANDLE FOR VESSELS.
No. 584,718. Patented June 15, 1897.
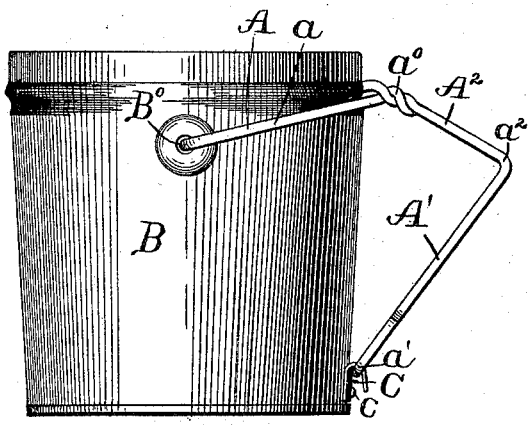
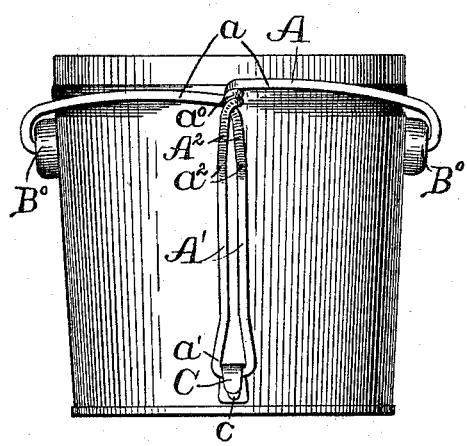
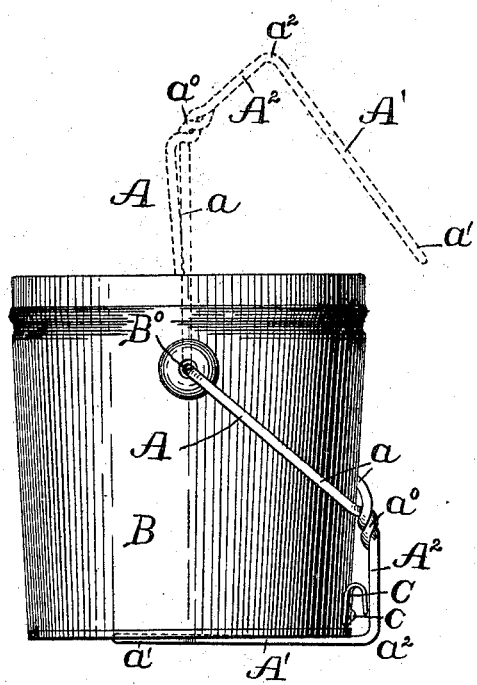
Witnesses
D. H. Blakelock
John L. Wilson
Inventor
Philip S. Witcher,
by Whitman & Whitman,
Attorneys

UNITED STATES PATENT OFFICE.

PHILIP S. WITCHER, OF SALT LAKE CITY, UTAH.

COMBINED BAIL AND HANDLE FOR VESSELS.

SPECIFICATION forming part of Letters Patent No. 584,718, dated June 15, 1897.

Application filed February 8, 1897. Serial No. 622,542. (No model.)

*To all whom it may concern:*

Be it known that I, PHILIP S. WITCHER, a citizen of the United States, residing at Salt Lake City, in the county of Salt Lake and State of Utah, have invented certain new and useful Improvements in a Combined Bail and Handle for Vessels; and I do hereby declare the following to be a full, clear, and exact description of the invention, such as will enable others skilled in the art to which it appertains to make and use the same.

My invention relates to improvements in handles for vessels, and has for its object to provide more particularly a combination bail and handle for pails and similar vessels, whereby the pail or other vessel may be carried when used as a bail or conveniently held when used as a handle.

My invention will be understood by reference to the accompanying drawings, wherein the same parts are indicated by the same letters throughout the several views.

Figure 1 represents a side view of a pail provided with my combination bail and handle and showing the latter as used as a handle. Fig. 2 is a view of the same as seen from the right in Fig. 1; and Fig. 3 is a side view of the pail provided with my combination bail and handle, the latter being shown as folded down into the position for storing the pail and its contents, the dotted lines in said figure indicating the position of the said combination bail and handle when used as a bail for carrying the pail.

A represents the combination bail and handle, having its two branching portions $a\ a$ bent at their ends and engaging in ears $B^0\ B^0$ of any suitable sort on the pail or bucket B.

This combination bail and handle, for the purposes of my invention, is preferably made of a single piece of stout wire of sufficient length, as hereinafter more fully described. After allowing sufficient length for the branching portions $a\ a$ of the bail the two members of the wire are twisted, as at $a^0$, and slightly bent to one side. A short straight portion $A^2$ is left adjacent to this twisted portion, and the two members of the wire are bent at approximately right angles, as at $a^2$, leaving the straight end portion $A'$. The bend at $a^2$ should be at such a point that when the bail and handle are folded down, as shown in full lines in Fig. 3, the straight portion $A'$ of the handle will lie flat against the bottom of the pail, as shown in said figure, and the bend at $a^0$ should be sufficiently great to allow the straight portion $A^2$ to occupy an approximately vertical position when the parts are folded as shown in the said figure.

C represents a flat hook or catch secured to the side of the pail at or near its bottom, as shown, by either being soldered thereto or riveted, as shown at $c$.

At the end of the straight portion $A'$ of the handle the members of the wire are spread, as shown at $a'$, thus forming a loop, which loop will, when the portion $A'$ of the handle is drawn out from under the bottom of the pail, engage the hook or catch C, as shown in Figs. 1 and 2, the handle being so bent that the end thereof will be held in position within the said catch by reason of its own resilience. When, however, it be desired to carry the pail as by the ordinary bail, the end of the handle may be readily disengaged from the catch C and the handle may be turned up to the position shown in dotted lines in Fig. 3.

It will thus be seen that I provide a very cheap, simple, and convenient combination bail and handle for pails and other vessels, whereby the said pail or vessel may be conveniently carried and handled, as desired.

Having thus described my invention, what I claim, and desire to secure by Letters Patent of the United States, is—

1. The combination with a pail or other similar vessel, of a bail; a handle rigidly connected to said bail and adapted to be folded beneath the bottom of said vessel when not in use; and a catch adapted to be engaged by said handle when in use, substantially as described.

2. The combination with a pail or other similar vessel, of a bail having at its middle portion an angular extension adapted to be folded beneath the bottom of said vessel when not in use; and a catch mounted upon the side of said vessel at or near the bottom thereof, and adapted to be engaged by said angular extension, substantially as described.

In testimony whereof I affix my signature in presence of two witnesses.

PHILIP S. WITCHER.

Witnesses:
THOMAS MARSHALL,
LULA GEOGHEGAN.